May 23, 1939.　　　D. R. HALL　　　2,159,267
WORK FIXTURE
Original Filed July 22, 1935　　3 Sheets-Sheet 1

INVENTOR
Donald R. Hall
By Parker, Carlson, Pitzner & Hubbard
ATTORNEYS

May 23, 1939.  D. R. HALL  2,159,267
WORK FIXTURE
Original Filed July 22, 1935  3 Sheets-Sheet 2

INVENTOR
Donald R. Hall
By Parker, Carlson, Pitzner & Hubbard
ATTORNEYS

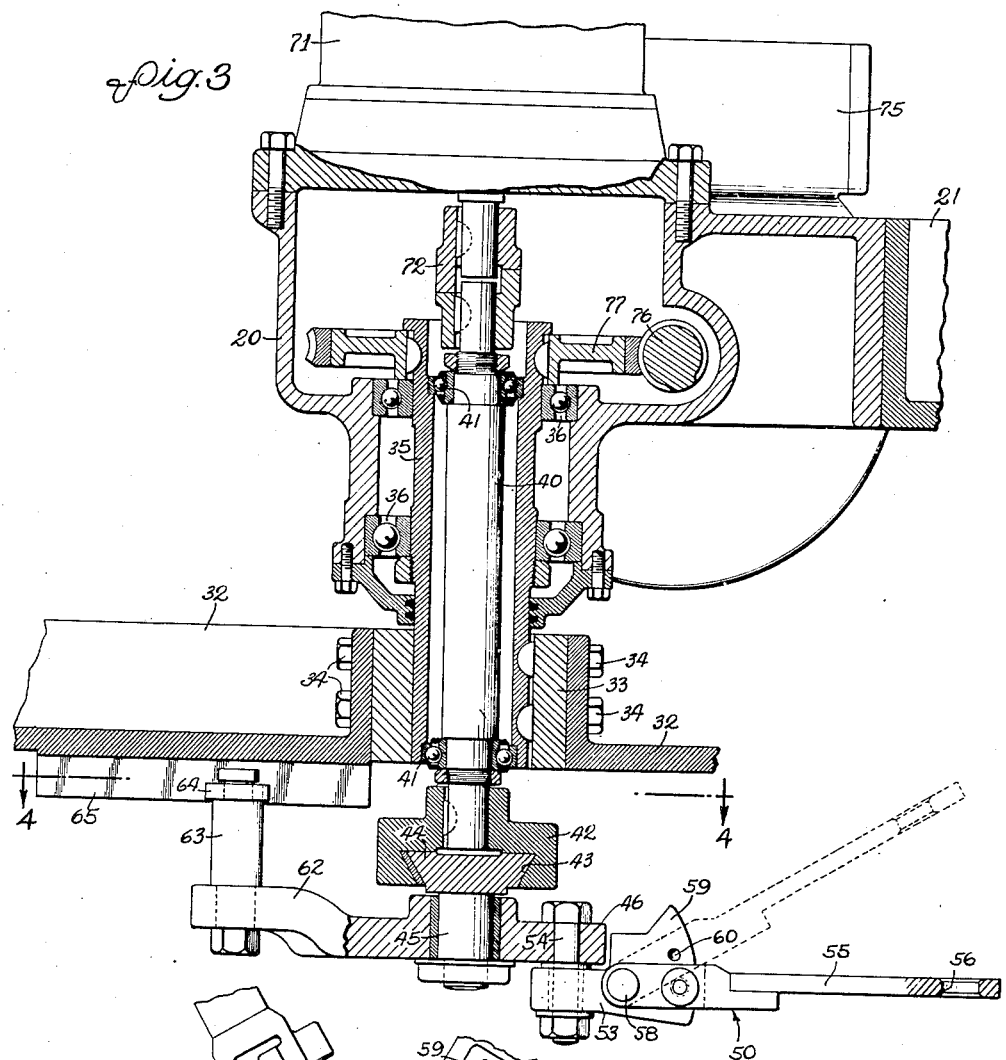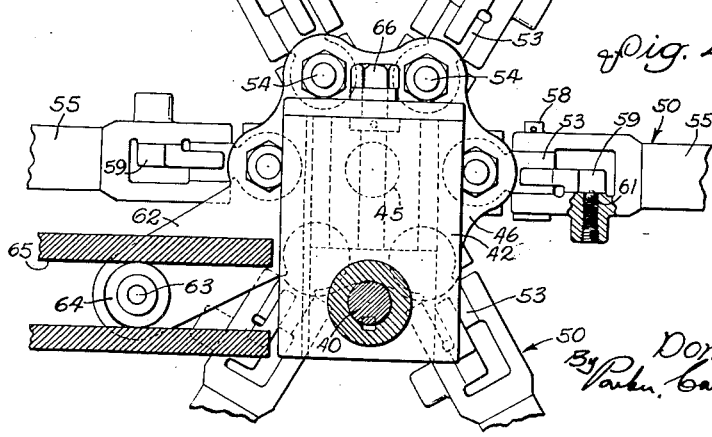

Patented May 23, 1939

2,159,267

UNITED STATES PATENT OFFICE 2,159,267

WORK FIXTURE

Donald R. Hall, Chicago, Ill., assignor to Gardner Machine Company, South Beloit, Ill., a corporation of Illinois Continuation of application Serial No. 32,579, July 22, 1935. This application October 29, 1938, Serial No. 237,796

20 Claims. (Cl. 51—122)

This application is a continuation of my prior application, Serial No. 32,579, filed July 22, 1935.

The invention relates generally to work fixtures and more particularly to a work fixture to be used in connection with a disk-type grinding machine.

The general object of the invention is to provide a work fixture adapted to handle a plurality of work pieces at one time, which may be operated with a minimum of labor, which effectively holds the work pieces in proper position relative to the grinding means, and which is of simple and relatively inexpensive construction.

It is also an object to provide a work fixture for handling a plurality of work pieces at one time on a disk-type grinding machine, the fixture being adapted to move the work pieces around the grinding disk at a rate sufficient to complete the operation during one turn around the disk, thus permitting them to be successively replaced at a fixed point.

Still another object resides in providing a work fixture which moves the work pieces radially of the disk during their progress around the disk so that different portions of the disk effect the grinding, and the pieces are uniformly ground.

Other objects and advantages will become apparent from the following description taken in connection with the accompanying drawings, in which:

Fig. 3 is an enlarged fragmentary sectional view taken on the line 3—3 of Fig. 2, but showing the work controlling structure turned through 90° from the position shown in Fig. 2.

Fig. 4 is a fragmentary horizontal section taken on the line 4—4 of Fig. 3.

Figure 1:
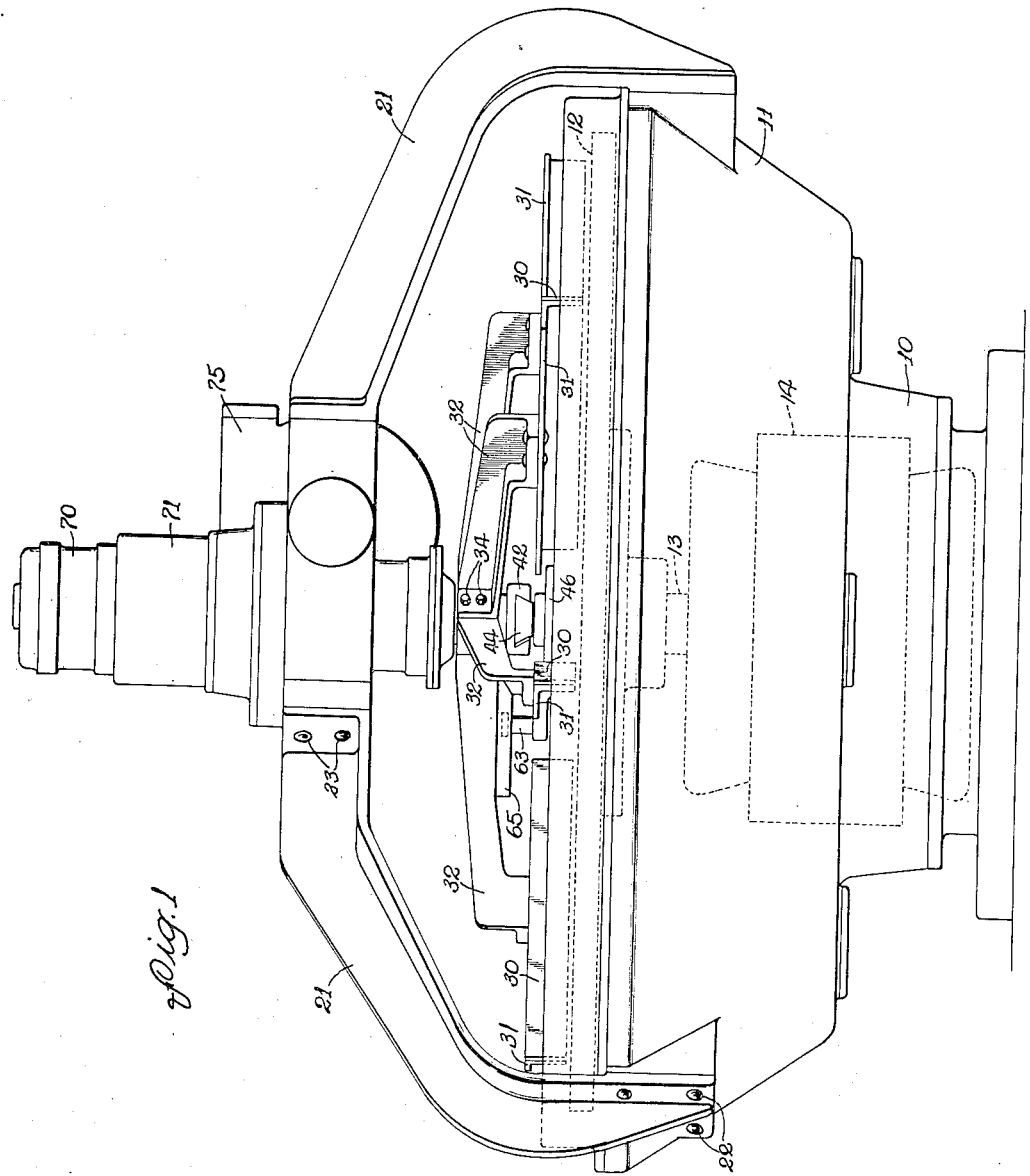
Figure 1 is an elevational view of a work fixture embodying the features of the invention, and shown in connection with a disk-like grinder.
Figure 2:
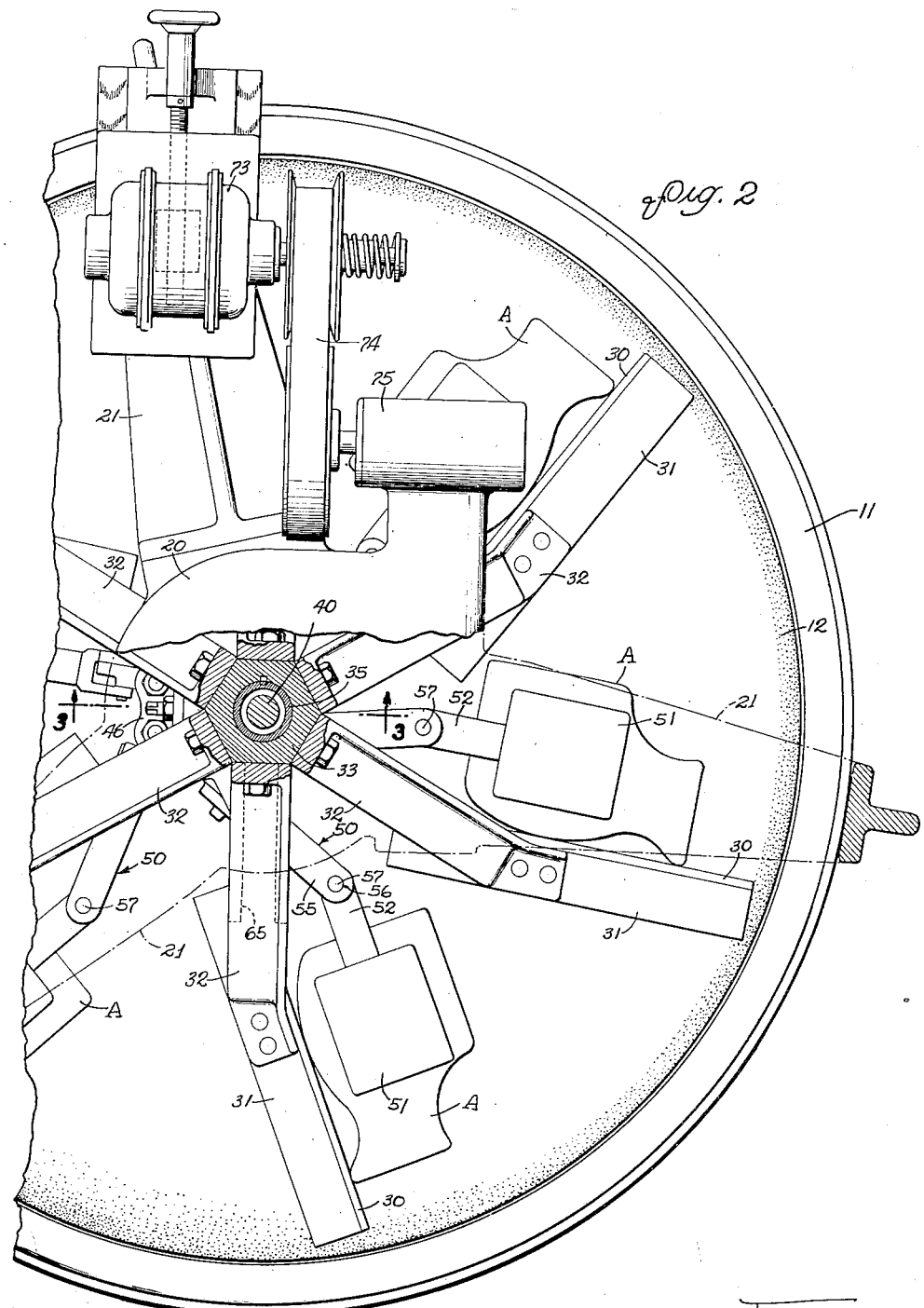
Fig. 2 is a fragmentary plan view, partially in section, of the work fixture and machine shown in Fig. 1.

The invention is for use in connection with a disk-type grinding machine, and the preferred embodiment is illustrated for use in connection with a vertical spindle machine. The grinding machine is shown generally in Figs. 1 and 2, and comprises a base 10 supporting a bowl-shaped frame 11. Within the latter is a grinding disk 12 spaced below the top edge of the frame 11 so that the frame serves as a peripheral guard for the grinding disk. The grinding disk 12 is mounted on a vertical spindle 13 which in the present instance is an extension of the shaft of an electric motor 14 mounted within the frame 11 and base 10.

The invention comprises a work fixture adapted to be mounted over the upper or grinding face of the grinding disk 12 for holding work pieces in grinding relation to the face of the disk and moving the work pieces around the disk so that a plurality of work pieces may be ground at one time under the control of a single operator. To this end, the work pieces are successively moved from a fixed point around the disk and simultaneously with such movement are moved radially of the grinding disk. The operator thus removes each work piece after it has moved around the disk and replaces it by another piece, the grinding operation being completed in one trip around the disk. The work pieces may be moved around the disk in either direction relative to the rotation of the disk but preferably are moved in the same direction.

The preferred embodiment of the invention comprises generally a frame adapted to be supported by the grinding machine. Carried by the frame is means for controlling the rotative movement of the work pieces around the disk, and also means for simultaneously reciprocating or causing movement of the work pieces radially of the disk. The means for reciprocating the work pieces is adjustable so that the range of reciprocation may be varied. The means for controlling the rotative movement of the work pieces is also variable so that the time required for a work piece to move around the disk may be suited to the type of work.

As illustrated in the drawings, the preferred embodiment comprises a frame structure or housing 20 spaced above and preferably concentric with the grinding disk 12. The frame structure is held in such position by a plurality of legs 21, three in the present instance, which extend radially from the frame structure and downwardly for attachment to the periphery of the machine frame 11, as by bolts 22. For strength and rigidity, the legs may have a T-shaped cross-section, and may be separate from the frame structure 20 but attached thereto as by bolts 23.

Carried by the frame structure 20 is means to control the rotative movement of the work pieces around the disk, such movement being due to the tendency of work pieces to rotate with the disk. Said means comprises a plurality of abutments 30 against which the respective work pieces, shown at A in Fig. 2, bear. The abutments 30 serve to limit the movement of the work pieces around the disk to the desired rate so that, in one trip around the disk, each work piece will have the grinding operation completed. The abutments 30 extend substantially radially of the grinding disk and are in the form of hardened plates mounted on angle members 31. Each angle member 31 is secured to the outer end of a radially extending arm 32, the several arms 32 being secured to a central member or hub 33 as by bolts 34. The hub 33 is carried on the lower end of a drive sleeve 35 journaled in the frame structure 20 by anti-friction bearings 36. Thus, upon rotation of the drive sleeve 35, the abutments 30 rotating therewith, limit or control the rate of travel of the work pieces around the disk.

The movement of the work pieces radially of the grinding disk may be of any desired extent and at any desired rate relative to the rotation of the work pieces. In the present instance, such movement is uniform in character and is effected by means including an eccentric. To this end, a drive shaft 40 (see Fig. 3) is journaled within the drive sleeve 35 as by anti-friction bearings 41. The shaft 40 extends downwardly below the drive sleeve 35 and hub 33 and has secured to its lower end a block 42. In the lower face of the block 42 is a transversely extending guideway 43 in which a slide 44 is adjustably mounted. The slide 44 carries on its lower face a downwardly extending eccentric crank shaft 45 on which is rotatably mounted an eccentric member in the form of a plate 46.

The eccentric member 46 is adapted to be connected to the work pieces by means of a plurality of arms indicated generally at 50. The connection of each arm 50 with the work piece is made by means of a weight 51, shown in Fig. 2, having a lug 52 connected to the arm. To facilitate placing work on the disk and removing it therefrom, each arm 50 is constructed for disengageable connection with the lug 52 of the weight. To this end, each arm has a two-part construction (see Figs. 3 and 4) comprising an inner part 53 pivoted on a vertical axis to the eccentric member 46 by a pin 54, and an outer part 55 which is provided with an aperture 56 at its outer end adapted to fit over a pin 57 on the lug 52 of the weight. In order that the outer part 55 of the arm may be disengaged from the pin 57, the former is pivotally connected to the inner part 53 of the arm by a pin 58 so that it may be lifted from the full-line position shown in Fig. 3 where it is engaged with the pin 57, to an out-of-the-way position shown in dotted lines. A spring detent is provided to releasably hold the part 55 in either position, comprising a sector-shaped portion 59 on the inner part 53, having a pair of indentations 60 adapted to receive a spring-pressed ball 61 carried by the outer part 55 of the arm.

The tendency of the eccentric member 46 is to rotate with the drive shaft 40 without giving any eccentric action. In the present instance, the eccentric member is held against such rotation and, since the work pieces are limited to rotation with the abutments 30, the eccentric member is connected so that it rotates with the abutments. To this end, the eccentric member 46 is provided with an arm 62 having an upstanding pin 63 on its free end. On the upper end of the pin 63 is a roller 64 operating in a guideway 65 formed on the lower side of one of the abutment-supporting arms 32. Thus, the eccentric member 46 is caused to rotate with the abutments 30 while the radial movement of the eccentric is provided for by movement of the roller 64 longitudinally of the guideway 65.

Since it is desirable to be able to vary the range of reciprocation produced by the eccentric member 46 to suit different types of work, the eccentricity of the eccentric shaft 45 to the drive shaft 40 may be varied by adjusting the slide 44 in the guideway 43. To effect such adjustment and to hold the slide in an adjusted position, a screw 66 is rotatably secured to the block 42, and is threaded into the slide 44.

The drive mechanism for the shaft 40 in the present instance comprises a motor 70 connected through a speed reducer 71 to the upper end of the shaft 40 by means of a coupling 72 positioned within the frame structure 20. The motor 70 and speed reducer 71 are preferably mounted over and are supported by the frame structure 20.

In the case of the drive for the sleeve 35 which rotates the abutments 30, the rate of rotation thereof must be different from the rate of rotation of the shaft 40 in order to effect reciprocation of the work pieces while they travel around the disk. In the preferred form, the rate of rotation of the shaft 40 is several times faster than the rotation of the sleeve 35. For this reason, it is preferable to provide a separate drive mechanism for the sleeve 35, which in the present instance comprises a motor 73 having a belt and pulley connection 74 with a speed reducer 75. The latter is connected to the drive sleeve 35 by means of a worm 76 driving a worm wheel 77 secured to the upper end of the sleeve 35 within the frame structure 20. Since the grinding operation on different types of work may require different lengths of time for completion, the speed reducer 75 is of the variable type in order to vary the rate of rotation of the sleeve 35.

In operation, the operator stands adjacent the side of the machine preferably on the side opposite the motor 73 and midway between two of the legs 21. He places a work piece on the grinding disk in contact with one of the abutments 30 and places a weight 51 on the work piece. The weight 51 causes the work piece to bear heavily enough against the grinding disk to be effectively ground. The arm 50 is then lowered from the dotted-line position shown in Fig. 3 and the aperture 56 in the arm is engaged over the pin 57 on the weight. The abutment 30 is meanwhile revolving at a rate sufficient to complete the grinding operation in one turn around the disk, the rotation of the disk holding the work piece against the abutment 30. Simultaneously with the rotary movement of the work piece, the eccentric member 46 through its connection with the weight is reciprocating the work piece radially of the disk. Thus, the work piece is uniformly ground during its travel.

After the work piece has made one turn around the disk, the grinding operation is completed. The work piece is then removed and another put in its place. Meanwhile other work pieces are placed adjacent the other abutments 30 so that the operator merely stands at the one position and loads and unloads the work pieces.

To vary the range of reciprocation effected by the eccentric member, the eccentric member 46 is moved along the guideway 43. The eccentric shaft 45 on which the member 46 is mounted is thus moved transversely of the drive shaft 40 to vary the eccentricity and hence the range of reciprocation.

Different types of work pieces may also require different lengths of time for the grinding operation. Adjustment of such time, or in other words, of the time taken for one turn around the disk, is provided for by adjusting the variable speed reducer 75.

Thus, from the above description, it will be apparent that a work fixture embodying the features of the invention is adapted to handle a plurality of work pieces at one time. The fixture requires a minimum of labor in connection with the operation thereof and effectively holds the work pieces in proper relation to the grinding disk. The work pieces are progressively moved around the grinding disk so that the grinding operation is completed in one turn, and during such progress, the pieces are moved radially of the disk to produce a uniform grinding.

I claim as my invention:

1. A work fixture for a disk-type grinding machine comprising, in combination, a frame adapted to be attached to the grinding machine, a plurality of abutments carried by the frame and extending substantially radially to control the movement of the work pieces, means for rotating said abutments, a plurality of weighted arms adapted to be connected to the work pieces, and means carried by the frame for reciprocating said arms substantially radially of the grinding disk, said arms being arranged to rotate with said abutments.

2. A work fixture for a disk-type grinding machine comprising, in combination, a frame adapted to be attached to the grinding machine, a plurality of abutments carried by the frame and adapted to control the rotative movement of the work pieces induced by the grinding disk, means for rotating said abutments concentrically with the disk, and means for simultaneously moving the work pieces transversely of the disk.

3. A work fixture for use in connection with a disk-type grinding machine comprising, in combination, a plurality of abutments for limiting the rotative movement of work pieces induced by rotation of the grinding disk and extending substantially radially of the disk, means for rotating said abutments around the disk at a predetermined rate, and means for reciprocating the work pieces transversely of their normal path and along said abutments.

4. A work fixture for a disk-type grinding machine comprising, in combination, a plurality of rotatable abutments for controlling the rotative movement of work pieces around the disk induced by rotation of the grinding disk, a plurality of arms adapted to be connected to the work pieces and connected to said abutments for rotation therewith, and means for reciprocating said arms radially of the grinding disk.

5. A work fixture for a disk-type grinding machine comprising, in combination, a rotatable member having a plurality of abutments for limiting the rotation of work pieces induced by rotation of the grinding disk, a member having a plurality of arms adapted to be connected to the work pieces, said members being interconnected to rotate with each other, and rotatable driving means carrying said last-mentioned member eccentrically thereof for causing reciprocation of the work pieces radially of the grinding disk.

6. A work fixture for a disk-type grinding machine comprising, in combination, a pair of concentric rotatable driving elements, a plurality of abutments driven by one of said elements for controlling the rotative movement of work pieces, and an eccentric driven by the other of said elements and having a plurality of arms adapted to be connected to the work pieces, said eccentric being connected for rotation with said abutments.

7. A work fixture for a disk-type grinding machine comprising, in combniation, a pair of concentric rotatable driving elements, a plurality of abutments driven by one of said elements for controlling the rotative movement of work pieces, a member eccentrically carried by the other of said elements and having a plurality of arms adapted to be connected to the work pieces, said member being connected for rotation with said abutments, and means for driving said elements at different rates of speed to cause reciprocation of the work pieces during rotation thereof.

8. A work fixture for a disk-type grinding machine comprising, in combination, a pair of concentric driving elements, and a pair of members rotatably driven by one of said elements, one of said members having a plurality of abutments for controlling the rotation of work pieces, the other of said members having a plurality of arms adapted to be connected to the work pieces and having an eccentric connection with its drive element, said elements being driven at different rates of speed whereby the work pieces are reciprocated during rotation with said abutment.

9. A work fixture for a vertical spindle disk-type grinding machine comprising, in combination, a frame adapted to be supported by the grinding machine, a driving sleeve rotatably carried by said frame concentrically with the grinding disk, a plurality of abutments carried by said sleeve and rotated thereby for controlling the movement of work pieces around the disk, a driving shaft mounted within said driving sleeve, an eccentric carried and driven by said shaft and connected to rotate with said abutments, a plurality of arms extending from said eccentric and adapted to be connected to the work pieces, and means carried by said frame for driving said sleeve and said shaft at different rates of speed to cause reciprocation of the work pieces during rotation thereof.

10. A work fixture for a vertical spindle disk-type grinding machine comprising, in combination, a frame adapted to be supported by the grinding machine, a driving sleeve rotatably carried by said frame concentrically with and over the grinding disk, a plurality of radially extending arms carried and rotated by said sleeve with a plurality of abutments carried by the respective arms for controlling movement of work pieces around the disk, a driving shaft mounted within said sleeve and rotatable relative thereto, an eccentric mounted on the lower end of said shaft and having a connection with one of said arms to prevent rotation of the eccentric with the shaft, said eccentric having a plurality of arms adapted to be connected to the work pieces, and means carried by the frame for driving said sleeve and said shaft.

11. A work fixture for a vertical spindle disk-type grinding machine comprising, in combination, a frame adapted to be supported by the grinding machine, a driving sleeve rotatably carried by said frame concentrically with and over the grinding disk, a hub carried on the lower end of said sleeve and having a plurality of arms extending radially therefrom, a plurality of abutments mounted on the ends of the respective arms and positioned substantially radially of the grinding disk and adjacent the grinding face thereof to control movement of work pieces on the grinding face, one of said arms having a radially extending guideway, a drive shaft rotatably mounted within said sleeve, an eccentric mounted on the lower end of said shaft and having a portion extending into said guideway to prevent rotation of the eccentric with the shaft, said eccentric having a plurality of arms adapted to be connected to the work pieces, and means carried by the frame for driving said sleeve and said shaft.

12. A work fixture for a vertical spindle disk-type grinding machine comprising, in combination, a frame adapted to be supported by the grinding machine, means carried by said frame including a plurality of abutments for controlling the rotative movement of the work pieces, a drive shaft rotatably supported by said frame, an eccentric adjustably carried on the lower end of said shaft and connected to said means for rotation therewith, a plurality of arms pivotally connected to said eccentric, a plurality of weights adapted to be placed on the respective work pieces to hold them in grinding relation to the disk and having disengageable connections with the respective arms, and means for driving said first-mentioned means and said shaft.

13. A work fixture for a vertical spindle disk-type grinding machine comprising, in combination, a plurality of abutments for controlling the rotative movement of the work pieces, and means for reciprocating the work pieces during rotation thereof comprising an eccentric, a plurality of arms pivotally connected to said eccentric, and a plurality of weights adapted to be placed on the respective work pieces, each of said arms having a portion pivoted on a horizontal axis for movement into and out of engagement with one of said weights and having a releasable holding device for holding said pivoted portion in its respective positions.

14. A work fixture for a disk-type grinding machine comprising, in combination, a plurality of abutments for controlling the rotative movement of the work pieces around the grinding disk, and means for reciprocating the work pieces during rotation thereof comprising a rotatably driven shaft, a block mounted on the end of said shaft and having a guideway extending transversely of the shaft, a member slidably mounted in said guideway, means for adjusting said member along said guideway to vary the eccentricity of said member relative to said shaft, and a plurality of arms extending from said member and adapted to be connected to the work pieces.

15. A work fixture for a disk-type grinding machine comprising, in combination, a rotatable member carrying a plurality of abutments for controlling the rotative movement of a plurality of work pieces around the grinding disk, an eccentric having a plurality of arms for reciprocating the work pieces radially of the grinding disk, means for driving said eccentric, and means for rotating said member including a variable speed device whereby the time taken by each work piece in moving around the disk may be varied.

16. A work fixture for a vertical spindle disk-type grinding machine comprising, in combination, a frame structure positioned centrally of and over the grinding disk and having a plurality of radially extending legs adapted to be secured to the machine frame at the periphery thereof, a drive sleeve rotatably mounted on a vertical axis in said frame structure and supporting at its lower end a plurality of abutments extending substantially radially of the grinding disk for controlling the rotative movement of work pieces, a drive shaft rotatably mounted within said sleeve, means carried by the lower end of said shaft for reciprocating the work pieces radially of the disk, driving mechanism for said shaft mounted on said frame structure, and driving mechanism for said sleeve carried by said frame structure and one of said legs.

17. A work fixture for a vertical-spindle disk-type grinding machine comprising, in combination, a frame structure located centrally over the disk and having a plurality of legs extending radially over the disk and adapted to be secured to the machine frame beyond the periphery of the disk, means depending from said frame for controlling the rotation concentrically of the disk of work pieces carried on the upper face of the disk, and means for reciprocating the work pieces radially of the disk.

18. A work fixture for a vertical-spindle disk-type grinding machine having a bowl-shaped frame comprising, in combination, a frame structure comprising a housing and a plurality of legs for supporting said housing centrally above the disk, said legs extending radially of the disk and thence downwardly for attachment to the outside of the bowl-shaped frame, means depending from said housing for controlling the rotation concentrically of the disk of the work pieces carried on the upper face of the disk, and means for causing movement of the work pieces radially of the disk while they are rotating.

19. A work fixture for a disk-type grinding machine comprising, in combination, a frame adapted to be attached to the grinding machine, a plurality of abutments carried by the frame and adapted to control the rotative movement of the work pieces induced by the grinding disk, means for rotating said abutments concentrically with the disk, a plurality of weights adapted to be placed on the respective work pieces to hold them in grinding relation to the disk, and means for reciprocating said weights to cause the work pieces to move radially of the disk along said abutments.

20. A work fixture for a disk-type grinding machine comprising, in combination, a frame adapted to be attached to the grinding machine, a plurality of weights adapted to rest on the respective work pieces to cause them to bear against the disk, a plurality of rotating abutments carried by the frame and adapted to control the rotative movement of the work pieces induced by the rotation of the grinding disk, and means cooperating with said abutments for moving said weights radially of the disk whereby the work pieces are moved transversely of their normal path and along said abutments.

DONALD R. HALL.